United States Patent
Wehrmann et al.

(10) Patent No.: US 6,940,626 B2
(45) Date of Patent: Sep. 6, 2005

(54) MULTILAYERED ARRANGEMENT FOR ELECTRO-OPTICAL DEVICE

(75) Inventors: Rolf Wehrmann, Krefeld (DE); Helmut-Werner Heuer, Krefeld (DE); Alexander Karbach, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 12 days.

(21) Appl. No.: 10/090,321

(22) Filed: Mar. 4, 2002

(65) Prior Publication Data

US 2002/0159127 A1 Oct. 31, 2002

(30) Foreign Application Priority Data

Mar. 7, 2001 (DE) .......................... 101 10 755
Jun. 6, 2001 (DE) .......................... 101 27 401

(51) Int. Cl.$^7$ .............................. G02F 1/03; G02F 1/07
(52) U.S. Cl. ...................... 359/245; 359/254; 359/321
(58) Field of Search ................... 359/245, 321, 359/266, 254; 252/583, 600; 428/426; 204/290.07

(56) References Cited

U.S. PATENT DOCUMENTS

| | | | | |
|---|---|---|---|---|
| 4,982,014 A | | 1/1991 | Freitag et al. .............. 568/721 |
| 5,111,327 A | * | 5/1992 | Blohm et al. ............... 526/256 |
| 5,126,428 A | | 6/1992 | Freitag et al. .............. 528/196 |
| 5,227,458 A | | 7/1993 | Freitag et al. .............. 528/196 |
| 5,300,575 A | | 4/1994 | Jonas et al. ................. 525/186 |
| 5,391,472 A | | 2/1995 | Muys et al. ................. 430/527 |
| 5,465,169 A | | 11/1995 | Eguchi ........................ 359/74 |
| 5,498,762 A | | 3/1996 | Eguchi ........................ 428/1 |
| 5,766,515 A | | 6/1998 | Jonas et al. ................. 252/500 |
| 5,976,284 A | * | 11/1999 | Calvert et al. ............... 156/51 |
| 6,225,040 B1 | | 5/2001 | Muys et al. ................. 430/533 |
| 6,445,489 B1 | * | 9/2002 | Jacobson et al. ........... 359/296 |
| 6,466,298 B1 | * | 10/2002 | Fix et al. .................... 349/195 |
| 6,515,787 B1 | * | 2/2003 | Westfall et al. ............. 359/265 |
| 2003/0038912 A1 | * | 2/2003 | Broer et al. ................ 349/122 |
| 2003/0076573 A1 | * | 4/2003 | Gates et al. ................ 359/245 |
| 2004/0041969 A1 | | 3/2004 | Tahon et al. ................ 349/123 |
| 2004/0043162 A1 | | 3/2004 | Tahon et al. ................ 428/1.2 |

FOREIGN PATENT DOCUMENTS

| | | |
|---|---|---|
| EP | 814 142 A2 | 12/1997 |
| EP | 814 142 A3 | 12/1998 |
| WO | 01/29611 A1 | 4/2001 |

* cited by examiner

*Primary Examiner*—Jordan M. Schwartz
*Assistant Examiner*—Jessica Stultz
(74) *Attorney, Agent, or Firm*—Jill Denesvich

(57) ABSTRACT

A layer arrangement including at least one transparent substrate having an electrically conductive layer, an electro-optically active layer, and a further substrate having an electrically conductive layer, characterized in that at least one of the two electrically conductive substrates is additionally coated with an organic conductive polymer system, can be employed for the construction of liquid-crystal displays.

11 Claims, No Drawings

MULTILAYERED ARRANGEMENT FOR ELECTRO-OPTICAL DEVICE

BACKGROUND

The present invention relates to a multilayered arrangement for electro-optical devices, particularly an arrangement having a conductive organic layer on a transparent electrode on a substrate, where the substrate is preferably a transparent polymer.

Display devices having cathode ray tubes (CRTs) which can be used for televisions or personal computers (PCs), and the like, have large-area screens. However, since a screen coated with a luminescent material must be arranged at a pre-determined distance from the electron gun in these display devices, a problem exists in that the total volume of such display devices is too large. Thus, a CRT device of this type cannot be used for electronic equipment having small dimensions and low power consumption, such as for a television set which can be hung on walls, for portable television sets and notebook computers, etc. For devices having small dimensions and low power consumption, flat panel display devices, such as liquid-crystal display devices (LCDs, for example TN, STN and DSTN displays, ferroelectric displays and polymer dispersed LC arrangements (PDLCs)), plasma display panels (PDPs), organic electroluminescent displays (OELDs), electrophosphorescent displays (OELDs with phosphorescent emitters) and vacuum fluorescent displays (VFDs), or electrochromic displays (ECDs) and electronic paper or electronic ink have been developed. Of these flat panel display devices, the LCDs have been the most researched recently, in spite of various disadvantages, since they have high image quality and low power consumption. There are two types of LCD: LCDs having a passive matrix and LCDs having an active matrix (AMLCD, active matrix LCD). Of these LCDs, the AMLCD is the LCD type which has been most used recently, since in these, each pixel can be addressed independently by a switching element, enabling a high contrast ratio and high resolution to be achieved since the interference caused by adjacent pixels is reduced.

In general, liquid crystals are easily affected by external influences, such as an electric field, a magnetic field, tension, pressure, and the like. Owing to these properties, liquid crystals are used as light diaphragms or even as display devices.

In order to utilize these properties of liquid crystals, they can, if necessary, be moved under the influence of the environment. For uniform alignment of liquid crystals, a homogeneous and smooth underlayer (substrate), inter alia, is vital in addition to the actual alignment layer (rubbed polyimide). The multilayered structure of various LCD types is described, for example, in "Displays: Einführung in die Technik aktiver und passiver Anzeigen" (Displays: Introduction to the Technology of Active and Passive Displays), Peter M. Knoll, Hüthig Verlag Heidelberg, 1986.

The interest in flexible displays and display devices has recently been increasing. The transparent substrates used here are polymer films, such as polycarbonate or other transparent polymers. These substrates are provided with a conductive layer, preferably indium-tin oxide (ITO). However, a disadvantage here is the excessive roughness of the conductive layer, which can result in short-circuits during operation and high reject rates during production. For manufacturing reasons, conventional inorganic conductive layers always have greater roughness on plastic substrates than on glass. Furthermore, inorganic conductive layers such as ITO are brittle, with the consequence that cracks occur on flexible substrates owing to the different coefficients of expansion or extensibility and toughness, which may result in interruption of the electrical conductivity. This arises in particular during storage and/or handling of coiled substrates, such as, for example, ITO-PET for roll to roll processes.

The object of the invention was therefore to develop novel layer arrangements which do not exhibit the said disadvantages.

SUMMARY

The invention relates to a layer arrangement comprising: (a) at least one transparent substrate having an electrically conductive layer, (b) an electro-optically active layer, and (c) an additional substrate having an electrically conductive layer, wherein at least one of the two electrically conductive substrates is also coated with an organic conductive polymer system. These and other features, aspects, and advantages of the present invention will become better understood with reference to the following description and appended claims.

DESCRIPTION

In order to achieve the object, a layer of an organic conductive polymer system is applied directly to the conductive layer, for example ITO, already present on the substrate. Application of the conductive polymer system compensates for surface roughness of the conductive layer on the substrate, particularly on plastic substrates. Furthermore, the polymer system bridges cracks that are present. Through its extensibility and toughness, it ensures that any cracks present after handling of the layer system according to the invention remain bridged by conductive paths and the surface conductivity is not interrupted.

The invention relates to a layer arrangement including at least one transparent substrate having an electrically conductive layer, an electro-optically active layer, and a further substrate having an electrically conductive layer, characterized in that at least one of the two electrically conductive substrates is additionally coated with an organic conductive polymer system.

In a preferred embodiment of the invention, the transparent conductive layer on the substrates in the layer arrangement consists of a metal or metal oxide or mixed oxides, which may also be doped, and the electro-optically active material is a liquid crystal. In a particularly preferred embodiment, the electro-optically active material is a liquid crystal, and at least one of the two substrates is a plastic substrate. For protection against environmental influences, such as mechanical damage, moisture, etc., the layer arrangement may be encapsulated.

The organic conductive polymer system may be, for example, a system based on polyanilines, polypyrroles or polythiophenes.

The term "conductive polymer systems" is taken to mean a system which may comprise further constituents in addition to the actual organic conductive polymer. These may be, for example, film formers, crosslinking agents, thermosolvents, binders or additives which improve the electrical conductivity. Examples are described in U.S. Pat. No. 5,766,515 or EP-A 602 713.

In a preferred embodiment of the invention, the organic conductive polymer is a cationically charged polythiophene comprising structural units of the formula (I)

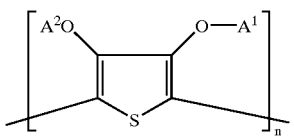

(I)

in which

A$^1$ and A$^2$, independently of one another, are optionally substituted (C$_1$–C$_{18}$)-alkyl or together form optionally substituted (C$_1$–C$_{18}$)-alkylene, and n is an integer from 2 to 10,000, preferably from 3 to 5000, in the presence of anions or polyanions.

Particularly preferred cationic polythiophenes are built up from structural units of the formula (Ia) or (Ib)

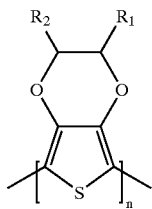

(Ia)

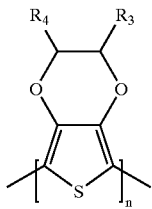

(Ib)

in which

R$_1$ and R$_2$, independently of one another, are hydrogen, optionally substituted (C$_1$–C$_{18}$)-alkyl, preferably (C$_1$–C$_{10}$)-alkyl, in particular (C$_1$–C$_6$)-alkyl, optionally substituted (C$_2$–C$_{12}$)-alkenyl, preferably (C$_2$–C$_8$)-alkenyl, optionally substituted (C$_3$–C$_7$)-cycloalkyl, preferably cyclopentyl or cyclohexyl, optionally substituted (C$_7$–C$_{15}$)-aralkyl, preferably phenyl-(C$_1$–C$_4$)-alkyl, optionally substituted (C$_6$–C$_{10}$)-aryl, preferably phenyl or naphthyl, optionally substituted (C$_1$–C$_{18}$)-alkoxy, preferably (C$_1$–C$_{10}$)-alkoxy, for example methoxy, ethoxy, n- or isopropoxy, or optionally substituted (C$_2$–C$_{18}$)-alkoxy esters, and R$_3$ and R$_4$, independently of one another, are hydrogen, but not both simultaneously, (C$_1$–C$_{18}$)-alkyl, preferably (C$_1$–C$_{10}$)-alkyl, in particular (C$_1$–C$_6$)-alkyl, which is substituted by at least one sulfonate group, hydroxyl group or carboxyl group, (C$_2$–C$_{12}$)-alkenyl, preferably (C$_2$–C$_8$)-alkenyl, which is substituted by at least one sulfonate group, hydroxyl group or carboxyl group, (C$_3$–C$_7$)-cycloalkyl, preferably cyclopentyl or cyclohexyl, which is substituted by at least one sulfonate group, hydroxyl group or carboxyl group, (C$_7$–C$_{15}$)-aralkyl, preferably phenyl-(C$_1$–C$_4$)-alkyl, which is substituted by at least one sulfonate group, hydroxyl group or carboxyl group, (C$_6$–C$_{10}$)-aryl, preferably phenyl or naphthyl, which is substituted by at least one sulfonate group, hydroxyl group or carboxyl group, (C$_1$–C$_{18}$)-alkoxy, preferably (C$_1$–C$_{10}$)-alkoxy, for example methoxy, ethoxy, n- or isopropoxy, which is substituted by at least one sulfonate group, hydroxyl group or carboxyl group, or (C$_2$–C$_{18}$)-alkoxy ester which is substituted by at least one sulfonate group, hydroxyl group or carboxyl group.

n is a number from 2 to 10,000, preferably from 3 to 5000.

Very particular preference is given to cationic or neutral polyalkylenedioxythiophenes of the formulae (Ia-1) and (Ib-1)

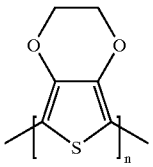

(Ia-1)

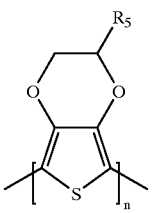

(Ib-1)

in which

R$_5$ is (C$_1$–C$_{18}$)-alkyl, preferably (C$_1$–C$_{10}$)-alkyl, in particular (C$_1$–C$_6$)-alkyl, which is substituted by at least one sulfonate group, hydroxyl group or carboxyl group, (C$_2$–C$_{12}$)-alkenyl, preferably (C$_2$–C$_8$)-alkenyl, which is substituted by at least one sulfonate group, hydroxyl group or carboxyl group, (C$_3$–C$_7$)-cycloalkyl, preferably cyclopentyl or cyclohexyl, which is substituted by at least one sulfonate group, hydroxyl group or carboxyl group, (C$_7$–C$_{15}$)-aralkyl, preferably phenyl-(C$_1$–C$_4$)-alkyl, which is substituted by at least one sulfonate group, hydroxyl group or carboxyl group, (C$_6$–C$_{10}$)-aryl, preferably phenyl or naphthyl, which is substituted by at least one sulfonate group, hydroxyl group or carboxyl group, (C$_1$–C$_{18}$)-alkoxy, preferably (C$_1$–C$_{10}$)-alkoxy, for example methoxy, ethoxy, n- or isopropoxy, which is substituted by at least one sulfonate group, hydroxyl group or carboxyl group, or (C$_2$–C$_{18}$)-alkoxy ester which is substituted by at least one sulfonate group, hydroxyl group or carboxyl group, and n is an integer from 2 to 10,000, preferably from 3 to 5000.

In a further preferred embodiment of the invention, n in the said formulae is an integer from 4 to 150, preferably from 4 to 50.

The polyanions used are the anions of polymeric carboxylic acids, such as polyacrylic acids, polymethacrylic acids, polymaleic acids and polymeric sulfonic acids, such as polystyrenesulfonic acids and polyvinylsulfonic acids. These polycarboxylic and -sulfonic acids may also be copolymers of vinylcarboxylic and vinylsulfonic acids with other polymerizable monomers, such as acrylates and styrene.

The counterion is particularly preferably the anion of polystyrene-sulfonic acid (PSA).

The molecular weight of the polyacids supplying the polyanions is preferably from 1000 to 2,000,000, particularly preferably from 2000 to 500,000. The polyacids or their alkali metal salts are commercially available, for example, polystyrenesulfonic acids and polyacrylic acids, or alternatively can be prepared by known processes (see, for example, Houben Weyl, Methoden der organischen Chemie [[Methods of Organic Chemistry], Vol. E 20 Makromolekulare Stoffe [Macromolecular Substances], Part 2, (1987), pp. 1141 et seq.).

Instead of the free polyacids necessary for the dispersions from polyalkylenedioxythiophenes and polyanions, it is also possible to employ mixtures of alkali metal salts of the polyacids and corresponding amounts of monoacids.

In the case of the formula (Ib-1), the polyalkylenedioxythiophenes carry positive and negative charges in the structural unit.

The preparation of the polyalkylenedioxythiophenes is described, for example, in EP-A 0 440 957 (=U.S. Pat. No. 5,300,575). The polyalkylenedioxythiophenes are prepared by oxidative polymerization. They thus attain positive charges, which are not shown in the formulae since their number and position cannot be determined precisely.

The polythiophene dispersion can be applied to the transparent conductive substrate by established processes, such as pouring, printing, spraying, dipping, flooding or ink-jet printing.

Suitable transparent substrates which are provided with a conductive layer are glass, ultrathin glass (flexible glass) or plastics.

At least one of the substrates preferably consists of plastic. Particularly suitable plastics are: polycarbonates, polyesters, copolycarbonates, polysulfone, polyether sulfone, polyimide, polyethylene, polypropylene or cyclic polyolefins or cyclic olefin copolymers (COCs) or hydrogenated styrene (co)polymers.

Preferred polymers are polysulfone, polyether sulfone, polyesters, cyclic olefin copolymers, hydrogenated styrene (co)polymers and polycarbonates. From the group consisting of the polyesters, preference is given to PET and PEN (polyethylene terephthalate and polyethylene naphthenate respectively).

Suitable polymer substrates are, for example, polyester films, PES films from the Sumitomo company or polycarbonate films from Bayer AG (Makrofol®).

These substrates may be provided with a scratch-resistant and/or chemical-resistant finish by means of an additional layer, for example Marnot® films (Bayer AG).

From the group consisting of the polycarbonates, the polycarbonates or copolycarbonates which contain one of the following segments are particularly suitable:

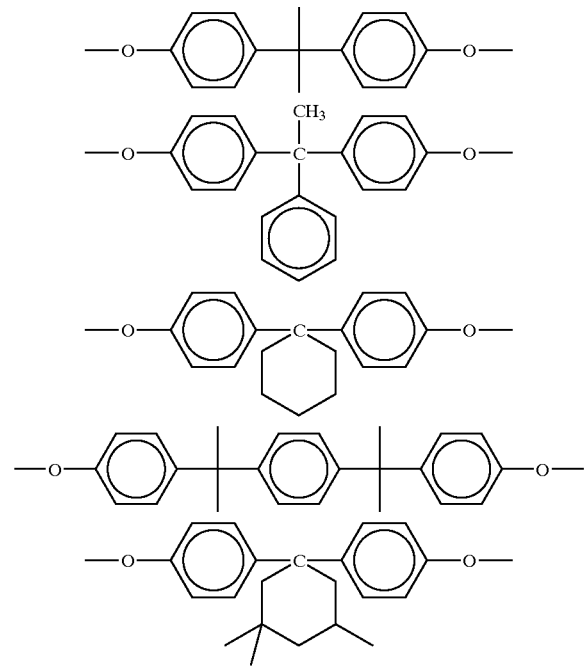

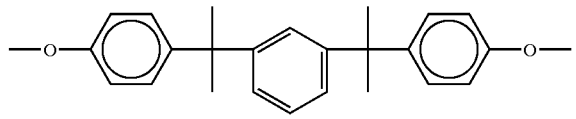

Further bisphenols for the synthesis of polycarbonates are described, for example, in EP-A 359 953.

The invention is further described in the following illustrative examples in which all parts and percentages are by weight unless otherwise indicated.

EXAMPLES

Example 1

Application of a Conductive Polythiophene Layer (Baytron®P) Layer to the ITO

About 10 ml of the approximately 1.2% strength poly (ethylenedioxy-thiophene)/polystyrenesulfonic acid solution (BAYER AG, Leverkusen, Baytron® P) are filtered (Millipore HV, 0.45 μm). The substrate is subsequently placed on a spin coater, and the filtered solution is distributed on the ITO-coated side of the substrate. The excess solution is subsequently spun off by rotating the plate at 500 rpm for a period of 3 minutes. The substrate coated in this way is subsequently dried for 5 minutes at 110° C. on a hot plate. The layer thickness is 60 nm (Tencor, Alphastep 200).

Table 1 shows the effect of the Baytron®P solution on the surface roughness of the substrate.

TABLE 1

| Substrate | Substrate | Roughness $r_a$ (nm) |
| --- | --- | --- |
| a) | Glass/ITO | 2.5 |
| b) | Glass/ITO/Baytron ®P | 1.6 |
| c) | Polyester (PET)/ITO | 3.9 |
| d) | Polyester (PET)/ITO/Baytron ®P | 2.5 |

The roughness values were determined with the aid of an atomic force microscope (AFM).

The smoothing action exerted by the conductive layer on the substrate surface is clearly evident. Sample d) shows no visible surface cracks even after repeated mechanical treatment—flexing, rolling, etc. The Baytron®P-coated substrates can be employed for the construction of conventional electro-optically active arrangements, such as, for example, liquid-crystal displays, electrochromic displays, etc.

Although the present invention has been described in detail with reference to certain preferred versions thereof, other variations are possible. Therefore, the spirit and scope of the appended claims should not be limited to the description of the versions contained therein.

What is claimed is:

1. A layer arrangement comprising:
   (a) at least one transparent substrate having an electrically conductive layer,
   (b) an electro-optically active layer,
   (c) an additional substrate having an electrically conductive layer, and
   wherein at least one of the two electrically conductive substrates is coated with an organic conductive polymer system based on polythiophenes;

wherein the organic conductive polymer system is a cationically charged polythiophene comprising structural units of the formula (I)

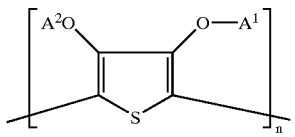

(I)

wherein

A$_1$ and A$_2$, independently of one another, are optionally substituted (C$_1$–C$_{18}$)-alkyl or together form optionally substituted (C$_1$–C$_{18}$)-alkylene, and n is an integer from 2 to 10,000, in the presence of anions or polyanions;

wherein the organic conductive polymer system is arranged adjacent to the electrical conductive layer.

2. The layer arrangement according to claim 1, wherein the electrically conductive layer on the substrates comprises a metal, a metal oxide or mixed oxides.

3. The layer arrangement according to claim 2, wherein the metal, metal oxide or mixed oxides is or are doped.

4. The layer arrangement according to claim 1, wherein the transparent substrate comprises glass or a plastic.

5. The layer arrangement according to claim 4, wherein the transparent substrate comprises a plastic, wherein the plastic is polycarbonate or copolycarbonate, polyester, polysulphone, polyether sulphone, polyimide, polypropylene, polyethylene or a cyclic olefin copolymer or hydrogenated styrene (co)polymer.

6. The layer arrangement according to claim 1, wherein at least one of the two substrates is a plastic substrate.

7. The layer arrangement according to claim 6, wherein the plastic is polycarbonate or copolycarbonate, polyester, polysulphone, polyether sulphone, polyimide, polypropylene, polyethylene or a cyclic olefin copolymer or hydrogenated styrene (co)polymer.

8. The layer arrangement according to claim 6, wherein the plastic substrate Is provided with at least a scratch-resistant or a chemical-resistant finish.

9. The layer arrangement according to claim 1, wherein the electro-optically active layer is a liquid-crystal layer.

10. The layer arrangement according to claim 1, wherein the arrangement is encapsulated.

11. The layer arrangement according to claim 1, wherein the cationically charged polythiophene is built up from structural units of the formula (Ia-1) or (Ib-1)

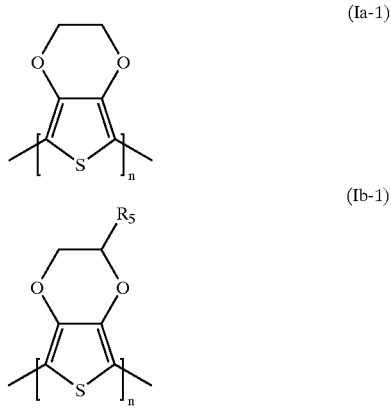

wherein

R$_5$ is (C$_1$–C$_{18}$)-alkyl, which is substituted by at least one sulphonate group, hydroxyl group or carboxyl group, (C$_2$–C$_{12}$)-alkenyl, which is substituted by at least one sulphonate group, hydroxyl group or carboxyl group, (C$_3$–C$_7$)-cycloalkyl, which is substituted by at least one sulphonate group, hydroxyl group or carboxyl group, (C$_7$–C$_{15}$)-aralkyl, which is substituted by at least one sulphonate group, hydroxyl group or carboxyl group, (C$_6$–C$_{10}$)-aryl, which is substituted by at least one sulphonate group, hydroxyl group or carboxyl group. (C$_1$–C$_{18}$)-alkoxy, which is substituted by at least one sulphonate group, hydroxyl group or carboxyl group, or (C$_2$–C$_{18}$)-alkoxy ester which is substituted by at least one sulphonate group, hydroxyl group or carboxyl group.

* * * * *